(12) United States Patent
Teo et al.

(10) Patent No.: US 9,397,517 B2
(45) Date of Patent: Jul. 19, 2016

(54) CABLE COMPENSATION BY ZERO-CROSSING COMPENSATION CURRENT AND RESISTOR

(71) Applicant: Infineon Technologies Austria AG, Villach (AT)

(72) Inventors: Yong Siang Teo, Singapore (SG); Kok Kee Lim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 158 days.

(21) Appl. No.: 14/150,571

(22) Filed: Jan. 8, 2014

(65) Prior Publication Data
US 2015/0194836 A1   Jul. 9, 2015

(51) Int. Cl.
| | | |
|---|---|---|
| *H02J 7/00* | (2006.01) | |
| *H02J 7/14* | (2006.01) | |
| *H02J 5/00* | (2016.01) | |
| *B60L 11/18* | (2006.01) | |
| *H02J 17/00* | (2006.01) | |

(52) U.S. Cl.
CPC ............... *H02J 7/0072* (2013.01); *H02J 5/005* (2013.01); *B60L 11/182* (2013.01); *B60L 11/1829* (2013.01); *H02J 7/00* (2013.01); *H02J 17/00* (2013.01); *Y02B 40/90* (2013.01)

(58) Field of Classification Search
USPC ......... 320/163, 107, 108, 109, 111, 137, 141, 320/145, 148, 162, 166; 363/147, 21.03; 307/104, 125; 323/318, 319
See application file for complete search history.

(56) References Cited

U.S. PATENT DOCUMENTS

| | | | |
|---|---|---|---|
| 8,143,845 B2 | 3/2012 | Choi | |
| 8,908,393 B2 * | 12/2014 | Ye | H02M 3/33592 363/21.06 |
| 2009/0268494 A1 * | 10/2009 | Hu | H02M 1/08 363/89 |
| 2010/0148730 A1 * | 6/2010 | Choi | H02J 7/08 320/145 |
| 2011/0074352 A1 * | 3/2011 | Huynh | H02M 3/33523 320/111 |
| 2011/0273148 A1 * | 11/2011 | Ueno | B60L 11/123 322/28 |

(Continued)

OTHER PUBLICATIONS

"AN-6067 Design and Application of Primary-Side Regulation (PSR) PWM Controller," Fairchild Semiconductor Corporation Datasheet, Rev. 1.0.2, Nov. 16, 2011, 21 pp., 14150571-GAU: 2859, Receipt date: Jan. 8, 2014.

*Primary Examiner* — Alexis A Boateng
(74) *Attorney, Agent, or Firm* — Shumaker & Sieffert, P.A.

(57) ABSTRACT

Methods, devices, and circuits are disclosed delivering a first level of output voltage to a rechargeable battery from a battery charger, the rechargeable battery is coupled to the battery charger by a charging cable. The methods, device, and circuits may further be disclosed applying, in response to an indication of an altered output voltage, a compensation current to one or more elements of the battery charger including a zero crossing (ZC) pin and a selected resistor, the selected resistor is defined by the charging cable coupling the battery charger to the rechargeable battery, and applying the compensation current to the ZC pin and the selected resistor causes an adjustment of the output voltage from the first level of output voltage to a second level of output voltage corresponding to the voltage drop from the impedance of the selected charging cable.

8 Claims, 11 Drawing Sheets

(56) References Cited

U.S. PATENT DOCUMENTS

| | | | | |
|---|---|---|---|---|
| 2013/0077360 A1* | 3/2013 | Low | ................ | H02J 5/005 363/47 |
| 2013/0195497 A1* | 8/2013 | Shimura | ................ | G03G 15/80 399/88 |
| 2013/0241527 A1* | 9/2013 | Russell | ................ | H02J 3/00 323/319 |
| 2013/0278224 A1* | 10/2013 | Ofek | ................ | H02M 7/219 320/137 |
| 2014/0268901 A1* | 9/2014 | Telefus | ................ | H02M 3/33576 363/21.01 |
| 2014/0354241 A1* | 12/2014 | Perisic | ................ | B60L 11/005 320/148 |
| 2015/0280584 A1* | 10/2015 | Gong | ................ | H02M 3/33515 363/21.13 |

\* cited by examiner

| Cable Impedance/mΩ | Original Circuit | | | Circuit with the cable compensation concept | | |
|---|---|---|---|---|---|---|
| | Output Voltage/V | | Percentage Spread/% | Output Voltage/V | | Percentage Spread/% |
| | Min | Max | | Min | Max | |
| 400 | 6.21 | 7.00 | 11.9% | 6.63 | 6.75 | 1.7% |
| 700 | 6.10 | 7.40 | 19.3% | 6.42 | 6.54 | 1.9% |

CABLE COMPENSATION BY ZERO-CROSSING COMPENSATION CURRENT AND RESISTOR

TECHNICAL FIELD

This disclosure relates to battery chargers, and more particular, to techniques and circuits that can provide for cable compensation in battery chargers.

BACKGROUND

Some battery charger circuits may use power converters that receive a power input from a power source and convert the power input to a power output that has a different (e.g., regulated) voltage or current level than the voltage or current level of the power input. The converter outputs the power output to a filter for powering a component, a circuit, or other electrical device. Switch-based power converters may use half-bridge circuits and signal modulation techniques to regulate the current or voltage level of the power output. In some examples, power converters may use additional feedback control circuits and techniques (e.g., voltage sensing, current sensing, and the like) to improve the accuracy and control of the voltage or current level of the power output. These aforementioned techniques and circuits for improving the accuracy and control of the voltage or current of the power output may decrease overall efficiency of the power converter and/or increase the physical size, complexity, and/or cost of the power converter.

SUMMARY

In general, techniques and circuits are described for enabling a power converter, such as a battery charger, to output a voltage level that can be contained within a narrow (e.g., accurate) voltage-level tolerance window when using different charging cables, all without increasing the cost and/or bill of materials for the power converter. A power converter, such as an isolated AC-DC converter or a switched mode power supply, may include one or more power switches, driver/control logic, and feedback control circuitry (e.g., current sensing or voltage sensing circuitry).

One example is directed to a method of delivering a first level of output voltage to a rechargeable battery from a battery charger, wherein the rechargeable battery is coupled to the battery charger by a charging cable, and applying, in response to an indication of an altered output voltage, a compensation current to one or more elements of the battery charger including a zero crossing (ZC) pin and a selected resistor, wherein the selected resistor is defined based on the charging cable coupling the battery charger to the rechargeable battery, wherein applying the compensation current to the ZC pin and the selected resistor causes an adjustment of the output voltage from the first level of output voltage to a second level of output voltage corresponding to the voltage drop from the impedance of the selected charging cable.

Another example is directed to a battery charging device comprising a transformer including a primary winding and an auxiliary winding, a primary-side-regulation (PSR) controller, and an adjustable offset voltage (AOV) circuit. The PSR controller including a zero crossing (ZC) pin, a ZC sample module, wherein the ZC sample module samples a ZC voltage at the ZC pin, a constant voltage control (CVC) module, wherein the PSR controller delivers voltage to the rechargeable battery based on the sampled ZC voltage at the ZC pin, and a compensation current control module. The compensation current control module comprising a sample-and-hold (S/H) module, wherein the S/H module samples and holds an output voltage, a voltage to current generator, wherein the voltage to current generator is configured to generate a compensation current as a function of the sampled output voltage, and wherein the compensation current control module is coupled to the ZC pin. The AOV circuit including a selected resistor, wherein the resistor is selected based on a charging cable, wherein the resistor is releasably coupled to the ZC pin and the auxiliary winding, and wherein an offset voltage at the ZC pin is generated by the compensation current and the resistor corresponding to the voltage drop due to cable impedance of the selected charging cable.

Another example is directed to circuit comprising a transformer including a primary winding and an auxiliary winding, a primary-side-regulation (PSR) controller, and an adjustable offset voltage (AOV) circuit. The PSR controller including a zero crossing (ZC) pin, a ZC sample module, wherein the ZC sample module samples a ZC voltage at the ZC pin, a constant voltage control (CVC) module, wherein the PSR controller delivers an output voltage to a rechargeable battery based on the sampled ZC voltage at the ZC pin, and a compensation current control module. The compensation current control module comprising a sample-and-hold (S/H) module, wherein the S/H module samples and holds the output voltage, a voltage to current generator module, wherein the voltage to current generator module is configured to generate a compensation current as a function of the sampled output voltage, and wherein the compensation current control module is coupled to the ZC pin. The AOV circuit including a selected resistor, wherein the resistor is selected based on a charging cable, wherein the resistor is releasably coupled to the ZC pin and the auxiliary winding, and wherein an offset voltage at the ZC pin is generated by the compensation current and the resistor corresponding to the voltage drop due to cable impedance of the selected charging cable.

The details of one or more examples are set forth in the accompanying drawings and the description below. Other features, objects, and advantages of the invention will be apparent from the description and drawings, and from the claims.

BRIEF DESCRIPTION OF DRAWINGS

FIG. 9 is a table depicting the difference between the systems with and without cable compensation shown in FIGS. 8A & 8B.

DETAILED DESCRIPTION

Figure 1:
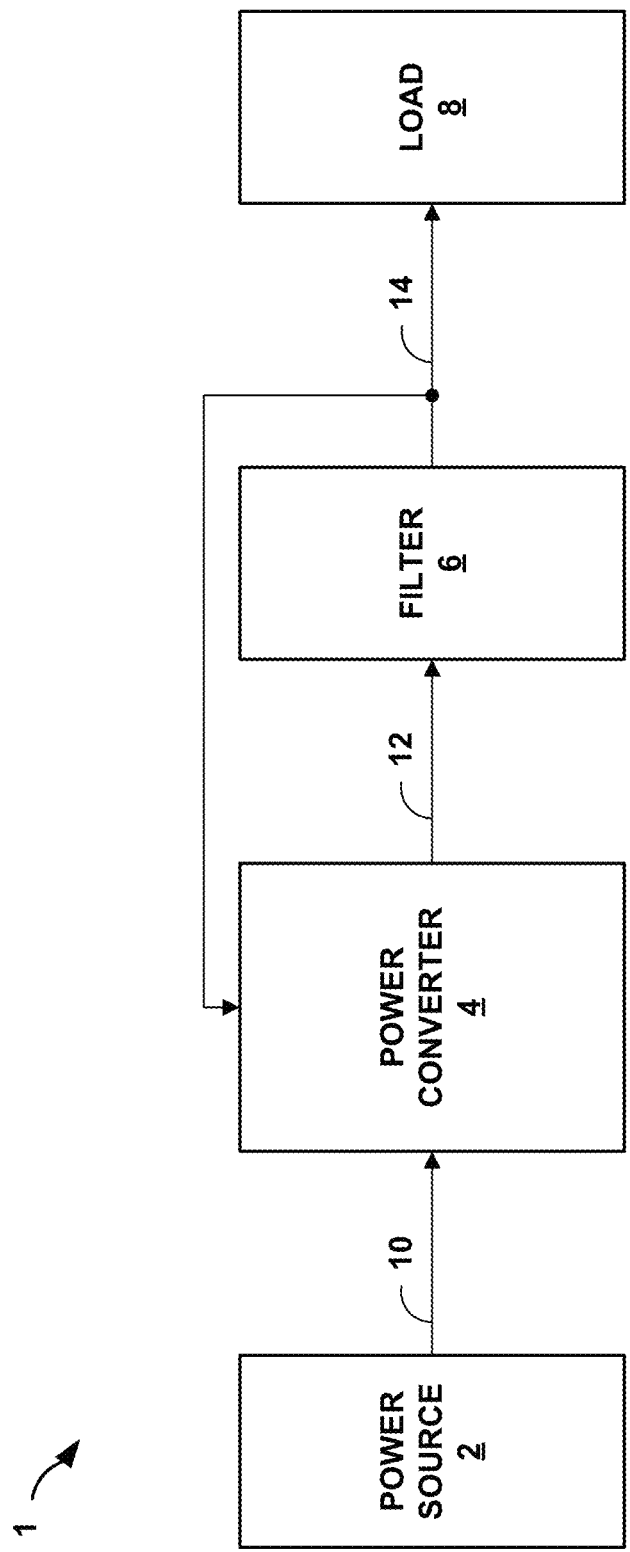
FIG. 1 is a block diagram illustrating a system for converting power from a power source, in accordance with one or more aspects of the present disclosure.

In a switched-mode power supply (SMPS), the AC mains input is directly rectified and then filtered to obtain a DC voltage. The resulting DC voltage is then switched on and off at a high frequency by electronic switching circuitry, thus producing an AC current that will pass through a high-frequency transformer or inductor. Switching occurs at a very high frequency (typically 10 kHz-1 MHz), thereby enabling the use of transformers and filter capacitors that are much smaller, lighter, and less expensive than those found in linear power supplies operating at mains frequency. After the inductor or transformer secondary, the high frequency AC is rectified and filtered to produce the DC output voltage. If the SMPS uses an adequately insulated high-frequency transformer, the output will be electrically isolated from the mains; this feature is often essential for safety. Switched-mode power supplies are usually regulated, and to keep the output voltage constant, the power supply employs a feedback controller that monitors current drawn by the load. The switching duty cycle increases as power output requirements increase.

In some applications, a switched-mode power supply or isolated AC-DC converter (hereafter referred to as a "power converter" or "converter") may receive a power (e.g., voltage, current, etc.) input and convert (e.g., by boosting) the power input to a power (e.g., voltage, current, etc.) output that has a voltage or current level that is different (e.g., regulated) than the voltage or current level of the power input, for instance, to provide the power output to a filter for powering a load (e.g., a device, or a rechargeable battery).

In either case, a power converter may have one or more switches (e.g., MOS power switch transistors based switches, gallium nitride (GaN) based switches, or other types of switch devices) arranged in a power stage configuration that the power converter controls, according to one or more modulation techniques, to change the current or voltage level of the power output by the power converter.

A power converter may include one or more gate drivers and control logic to control (e.g., turn-on and turn-off) the one or more switches of the power stage using modulation techniques. Such modulation of the switches of a power stage may operate according to pulse-density-modulation (PDM), pulse-width-modulation (PWM), pulse-frequency-modulation (PFM), or another suitable modulation technique. By controlling the switches of a power stage using modulation techniques, a power converter can regulate the current or voltage level of the power being outputted by the power converter.

Some power converters may use feedback circuits and techniques for performing current sensing and/or voltage sensing to obtain information about a current or voltage level of a power output. The power converter may use the information received using feedback circuits and techniques to improve the accuracy of the power output. For example, the power converter may use the feedback information to contain the voltage or current level of a power output within a particular tolerance or threshold window for satisfying the voltage and/or current requirements of a load. Some power converters may use voltage sensing as one example of feedback circuits and techniques to determine the real-time voltage level of the power being outputted to a load. If the power converter determines that the voltage level does not satisfy the voltage requirements of the load, then the power converter may adjust or change how the power converter controls the power switches in order to adjust or change the voltage level of the power output until the voltage level of the power output is contained within the tolerance window and satisfies the voltage level associated with the voltage requirements of the load.

In general, circuits and techniques of this disclosure may enable a system including a power converter to output power with a voltage level that can compensate for voltage drop due to cable impedance of a selected charging cable, but also can be contained within a narrow (e.g., accurate) voltage-level tolerance window, all without increasing cost and/or decreasing efficiency of the power converter. A power converter, such as a flyback converter, may include one or more power switches, driver/control logic, and feedback control circuitry (e.g., voltage sensing circuitry).

A flyback converter is used in both AC/DC and DC/DC conversion with galvanic isolation between the input and any outputs. More precisely, the flyback converter is a boost converter with the inductor split to form a transformer, so that the voltage ratios are multiplied with an additional advantage of isolation. When driving for example a plasma lamp or a voltage multiplier the rectifying diode of the boost converter is left out and the device is called a flyback transformer.

FIG. 1 is a block diagram illustrating system 1 (e.g. battery charger) for converting power from power source 2, in accordance with one or more aspects of the present disclosure. FIG. 1 shows system 1 as having four separate and distinct components shown as power source 2, power converter 4, filter 6, and load 8, however system 1 may include additional or fewer components. For instance, power source 2, power converter 4, filter 6, and load 8 may be four individual components or may represent a combination of one or more components that provide the functionality of system 1 as described herein.

System 1 includes power source 2 which provides electrical power to system 1. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

System 1 includes power converter 4 which operates as a switched-mode power supply that converts one form of electrical power provided by power source 2 into a different and usable form, of electrical power for powering load 8. Power converter 4 may be a flyback converter that outputs power with a higher voltage level than the voltage level of input power received by the flyback converter. A flyback converter is used in both AC/DC and DC/DC conversion with galvanic isolation between the input and any outputs. More precisely, the flyback converter is a boost converter with the inductor split to form a transformer, so that the voltage ratios are multiplied with an additional advantage of isolation. Examples of power converter 4 may include battery chargers, microprocessor power supplies, and the like. Power converter 4 may operate as a DC-to-DC, DC-to-AC or AC-to-DC converter.

System 1 further includes filter 6 and load 8. Load 8 receives the electrical power converted by power converter 4 after the power passes through filter 6. In some examples, load 8 uses the filtered electrical power from power converter 4 and filter 6 to perform a function. Numerous examples of filter 6 exist and may include any suitable electronic filter for filtering power for a load. Examples of filter 6 include, but are not limited to, passive or active electronic filters, analog or digital filters, high-pass, low-pass, band pass, notch, or all-pass filters, resistor-capacitor filters, diode-capacitor filters, inductor-capacitor filters, resistor-inductor-capacitor filters, and the like. Likewise, numerous examples of load 8 exist and may include, but are not limited to, computing devices and related components, such as microprocessors, electrical components, circuits, laptop computers, desktop computers, tablet computers, mobile phones, batteries (i.e., rechargeable), speakers, lighting units, automotive/marine/aerospace/train related components, motors, transformers, or any other type of electrical device and/or circuitry that receives a voltage or a current from a power converter.

Power source 2 may provide electrical power with a first voltage or current level over link 10. Load 8 may receive electrical power that has a second voltage or current level, converted by power converter 4, and filtered through filter 6, over link 14. Links 10, 12, and 14 represent any medium capable of conducting electrical power from one location to another. Examples of links 10, 12, and 14 include, but are not limited to, physical and/or wireless electrical transmission mediums such as electrical wires, electrical traces, conductive gas tubes, twisted wire pairs, and the like. Each of links 10 and 12 provide electrical coupling between, respectively, power source 2 and power converter 4, and power converter 4 and filter 6. Link 14 provides electrical coupling between filter 6 and load 8. In addition, link 14 provides a feedback loop or circuit for carrying information to power converter 4 associated with the characteristics of a filtered power output from filter 6.

In the example of system 1, electrical power delivered by power source 2 can be converted by converter 4 to power that has a regulated voltage and/or current level that meets the voltage and/or current requirements of load 8. For instance, power source 2 may output, and power converter 4 may receive, power which has a first voltage level at link 10. Power converter 4 may convert the power which has the first voltage level to power which has a second voltage level that is required by load 8. Power converter 4 may output the power that has the second voltage level at link 12. Filter 6 may receive the power from converter 4 and output the filtered power that has the second voltage level at link 14.

Load 8 may receive the filtered power that has the second voltage level at link 14. Load 8 may use the filtered power having the second voltage level to perform a function (e.g., charge a battery). Power converter 4 may receive information over link 14 associated with the filtered power that has the second voltage level. For instance, feedback control (e.g., voltage sensing or current sensing) circuitry of power converter 4 may detect the voltage or current level of the filtered power output at link 14 and driver/control logic of converter 4 may adjust the power output at link 12 based on the detected voltage or current level to cause the filtered power output to have a different voltage or current level that fits within a voltage or current level tolerance window required by load 8.

Figure 2:
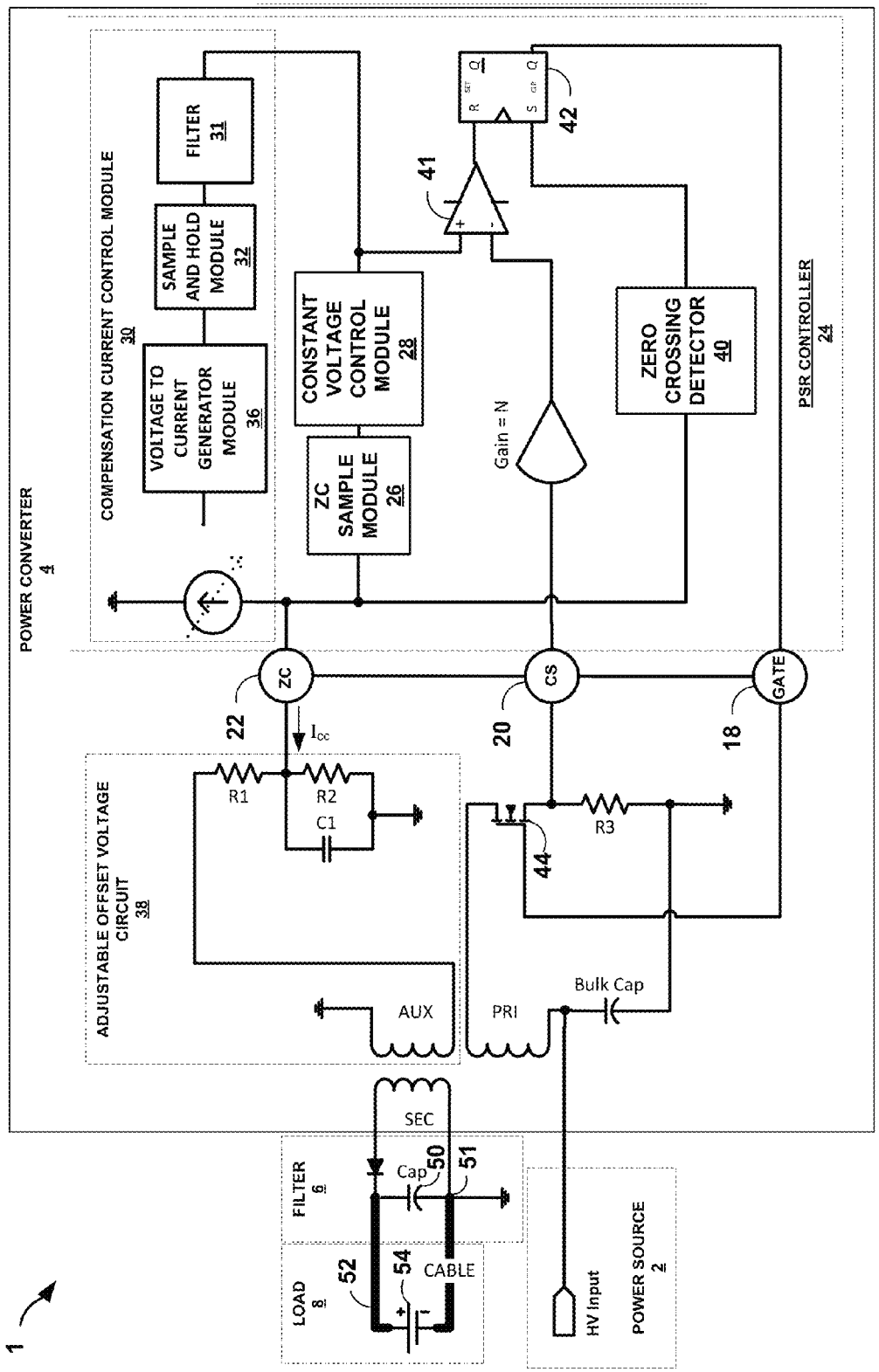
FIG. 2 is a block diagram illustrating one example of a system shown in accordance with an example of the present disclosure.

FIG. 2 is a block diagram illustrating one example of a system 1 in accordance with an example of the present invention. A power source 2 (rectified voltage at an HV input) is coupled to the primary windings of a transformer through an input bulk capacitor. The voltage developed on the secondary windings of the transformer is coupled to a filter 6 (output capacitor 50 and secondary diode (not shown)). The voltage from filter 6 is presented as the output voltage generated by the power converter 4 at load 8, as described and shown in FIG. 1. Nodes 50 and 51 of filter 6 represent connectors to which a charging cable 52 is connected to charge a load 8 (rechargeable battery 54). The battery voltage is the resulting voltage developed across rechargeable battery 54 by the output voltage from the secondary windings of the transformer. The operation of power converter 4 is controlled by primary-side-regulation (PSR) controller 24, which is implemented as an IC (integrated circuit) chip.

In the example of FIG. 2, PSR controller 24 includes ZC sample module 26, constant voltage control (CVC) module 28, zero crossing detector 40, comparator 41, SR (set-reset) flip-flop 42, transistor 44, and gain N.

ZC sample module 26 samples the ZC voltage when the secondary side current flowing from the secondary winding has discharged to zero. Upon detecting the secondary side current has discharged to zero ZC sample module 26 samples the voltage at a zero crossing pin (ZC pin 22 as described below) and provides a signal or the zero crossing voltage to constant voltage control (CVC) module 28. In some examples, ZC sample module 26 is a sample-and-hold (S/H) module.

CVC module 28 uses the zero crossing voltage to determine whether load 8 has increased or decreased and adjusts its output voltage according to the output voltage of power converter 4 to control the voltage delivered to load 8, and keep the voltage within a tight tolerance. In one example, CVC module 28 is a proportional-integral (PI) controller. In other examples, CVC module 28 is a proportional-integral-derivative (PID) controller.

Zero crossing detector 40 detects the zero crossing voltage at the zero crossing pin (ZC pin 22 as described below) in order to provide a "set" signal to a SR flip-flop (e.g., SR flip-flop 42 as described below). In other examples, zero crossing detector 40 could be replaced with an oscillator or the like.

Comparator 41 compares the signals from CVC module 28 and the current sense pin (CS pin 20 as described below) and sends a "reset" signal to SR flip-flop 42 when the signal from CVC module 28 is equal to or greater than the current sense pin.

SR flip-flop 42 provides a control signal to transistor 44 to turn ON or OFF depending on the signals from zero crossing detector 40 and comparator 41.

Transistor 44 controls whether the primary winding of the transformer is connected to ground. When transistor 44 is provided an ON signal from SR flip-flop 42, transistor 44 turns ON and connects the primary winding of the transformer and resistor R3 to ground. When transistor 44 is provided an OFF signal from SR flip-flop 42, transistor 44 turns OFF and disconnects the primary winding of the transformer and resistor R3 from ground. In some examples, transistor 44 is a MOSFET transistor.

Gain N provides the gain necessary to compare the signal or voltage of CS pin 20 to the signal or voltage of CVC module 28.

The use of an IC chip may have a variety of benefits including small form factor and low manufacturing cost. In the example of FIG. 2, PSR controller 24 is in an IC packaging with pins 18, 20, 22, which are schematically shown in FIG. 2 as nodes in power converter 4. Pin 18 is the gate pin and provides a control signal to drive the gate of a transistor (MOSFET transistor 44). Pin 20 is the current sense (CS) pin and provides a signal indicative of the drain-to-source current flowing through the transistor when ON. Pin 22 is the zero crossing (ZC) pin and provides the zero crossing voltage from the auxiliary winding of the transformer which is sampled by ZC sample module 26.

Figure 4:
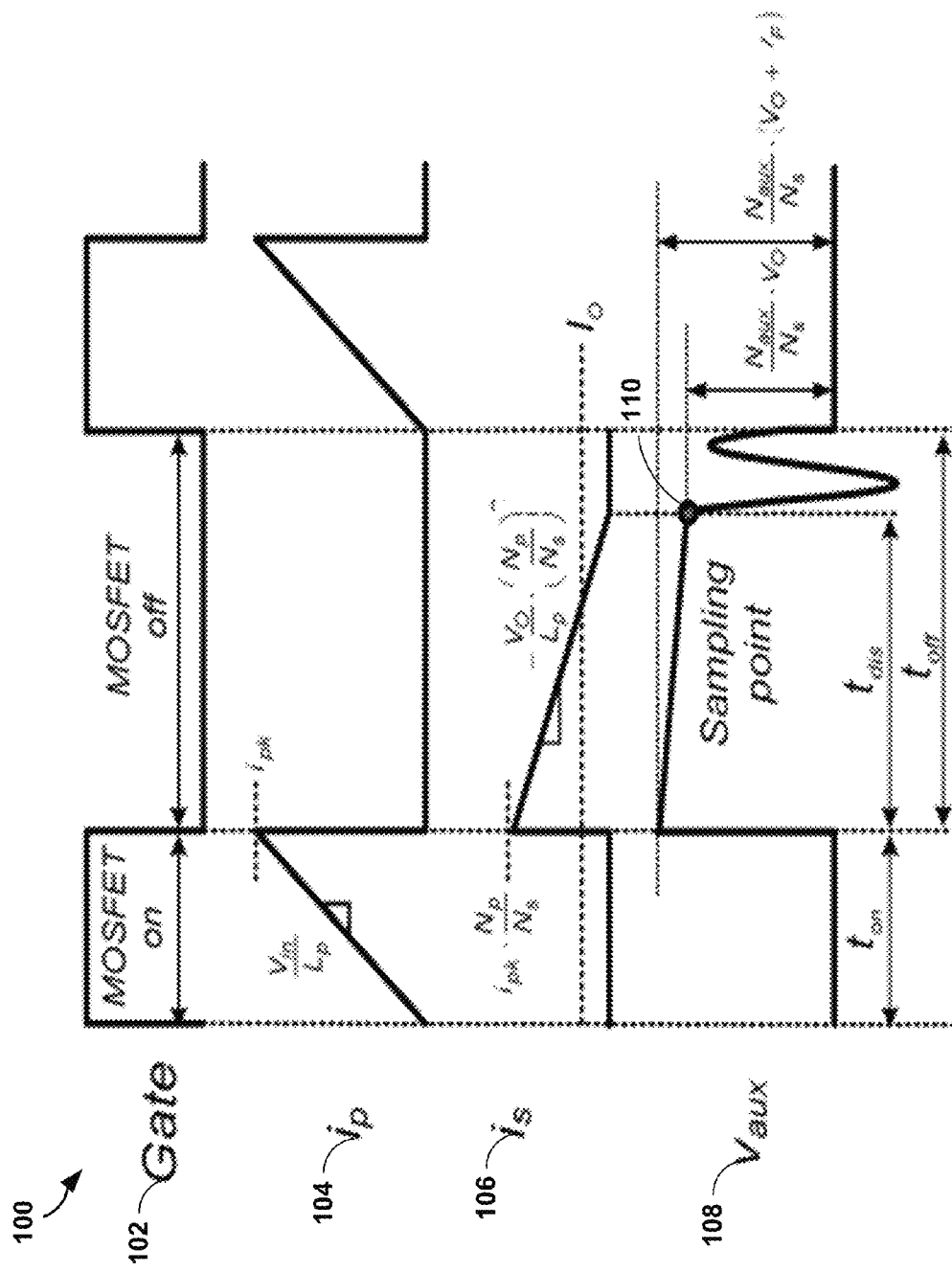
FIG. 4 is a conceptual diagram illustrating the sampling point of voltage on the auxiliary winding of the transformer, in accordance with one or more aspects of the present disclosure.

In one example of FIG. 2, power converter 4 uses ZC sample module 26 of PSR controller 24 to sample the voltage at ZC pin 22. In a standard PSR controller, the voltage at the ZC pin is the zero crossing voltage, and is sampled at the point just before the voltage on the auxiliary winding starts to oscillate (as shown in FIG. 4). The oscillation is due to the existence of the L-C circuit formed by the transformer inductance and the MOSFET output capacitance COSS. When the current in the output diode decreases to 0, the voltage on the auxiliary winding begins to oscillate. The zero crossing (ZC) voltage just before the oscillation of the auxiliary winding and when the secondary-side diode (not shown) is about to be cut off may be very close to the output voltage across load 8. The sampled ZC voltage by ZC sample module 26 passes through CVC module 28 (e.g., a PI controller or PID controller depending on the requirements). The output voltage or signal of CVC module 28 can provide information on the output voltage level of power converter 4 to comparator 41. The output voltage or signal of CS pin 20 in combination with gain N can provide information to comparator 41 on the actual output voltage level of power converter 4 to load 8. Comparator 41 compares the output voltage or signal of CVC module 28 to the output voltage or signal of CS pin 20 in combination with gain N to determine whether to send a control signal (i.e., a "reset" signal) to SR flip-flop 42. Zero crossing detector 40 sends a control signal (i.e., a "set" signal) to SR flip-flop 42 after detection of a zero crossing voltage at ZC pin 22. In another example, zero crossing detector 40 may be replaced by an oscillator, or another type of clock. SR flip-flop 42 sends a control signal to gate pin 18 which is coupled to transistor 44, and the control signal turns ON and OFF transistor 44, allowing PSR controller 24 to control power converter 4 and the amount of power delivered to filter 6 and load 8.

In the example of FIG. 2, power converter 4 compensates for the voltage drop across the cable by introducing a variable compensation current flowing into the zero crossing pin (ZC pin) 22. When the output voltage of system 1 is high, load 8 of system 1 is also high. When load 8 is high, load 8 requires a higher output current flowing through the charging cable, and the impedance of the charging cable causes voltage loss when the output current is high. As a result, a compensation current $I_{cc}$ dependent on load 8, is provided to AOV circuit 38 to provide an offset voltage to PSR controller 24 to compensate for the voltage loss due to the impedance of the charging cable. A compensation current $I_{cc}$ may be introduced by compensation current control module 30 to ZC pin 22 to compensate for the voltage drop due to cable impedance of the charging cable. Compensation current $I_{cc}$ and an externally attached resistor, such as resistor R1 of AOV circuit 38, introduce a voltage offset to ZC pin 22 causing the sampled voltage at ZC pin 22 to be higher. The offset voltage is representative of the voltage drop introduced by the cable impedance of the charging cable. Moreover, the offset voltage allows PSR controller 24 of power converter 4 to receive feedback that the output voltage at load 8 may be higher or lower than previously sampled by PSR controller 24. PSR controller 24 may control power converter 4 to deliver additional power to filter 6 and load 8 to compensate for the lower output power due to the impedance of the charging cable and the increase and/or decrease in load 8. In this manner, the power provided by power converter 4 follows load 8 because compensation current $I_{cc}$ is dependent on load 8.

In one example implementation of PSR controller 24, the PSR controller turns on the MOSFET, the transformer current $i_p$ will increase linearly from zero to $i_{pk}$ as shown in Equation 1 below. During the turn-on period the energy is stored in the transformer. When the MOSFET turns off ($t_{off}$), the energy stored in transformer will deliver to the output of the power converter through the output rectifier. During this period, the output voltage $V_O$ and diode forward voltage $V_F$ will be reflected to the auxiliary winding $N_{AUX}$, the voltage on the auxiliary winding $N_{AUX}$ can be expressed by Equation 2. In some examples, a sampling module is applied to sample the reflected voltage, such as ZC sample module 26 to sample the reflected voltage at ZC pin 22. The correlated output voltage information can be obtained because the forward voltage of the output rectifier becomes a constant. After that, the sampled voltage compares with a precise reference voltage to develop a voltage loop for determining the on-time of the MOSFET and regulating an accurate constant output voltage.

$$i_{pk} = \frac{V_{IN}}{L_p} \times t_{on} \qquad (1)$$

$$V_{AUX} = \frac{N_{AUX}}{N_S} \times (V_O + V_F) \qquad (2)$$

In Equation 1, $L_P$ is the primary winding inductance of the transformer; $V_{IN}$ is the input voltage of the transformer; $t_{on}$ is the on-time period of the MOSFET. In Equation 2, $N_{AUX}/N_S$ is the turn ratio of the auxiliary winding and secondary output winding; $V_O$ is the output voltage; and $V_F$ is the forward voltage of the output rectifier.

This sampling approach also duplicates a discharge time ($t_{dis}$), the output current $I_O$ is related to secondary side current of the transformer. It can be calculated by the signal $i_{pk}$, $t_{dis}$ as expressed in Equation 3 below. The PSR controller uses this result to determine the on-time of the MOSFET and regulate a constant output current. The current-sense resistor $R_{SENSE}$ is used to adjust the value of the output current.

$$I_O = \frac{1}{2t_S}\left(i_{pk} \times \frac{N_P}{N_S} \times t_{dis}\right) = \frac{1}{2t_S}\left(\frac{V_{CS}}{R_{SENSE}} \times \frac{N_P}{N_S} \times t_{dis}\right) \qquad (3)$$

In Equation 3, $t_S$ is the switching period of the PSR controller; $N_P/N_S$ is the turn ratio of the primary winding and secondary output winding; $R_{SENSE}$ is the sense resistance for converting the switching current of the transformer to a voltage $V_{CS}$.

Figure 3:
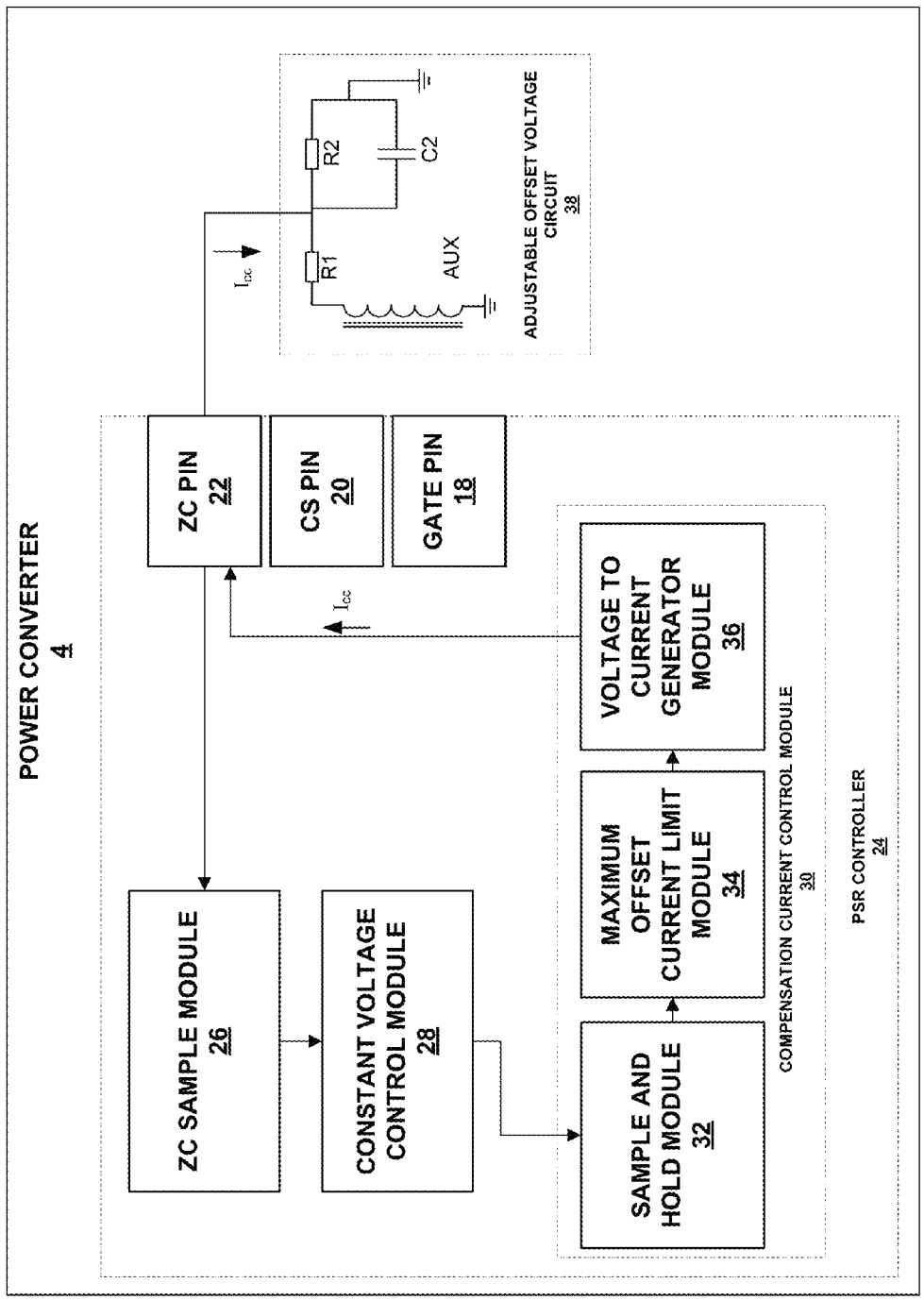
FIG. 3 is a block diagram illustrating an example of a power converter in accordance with an example of the present disclosure.

FIG. 3 is a block diagram illustrating an example of power converter 4 in accordance with an example of the present invention. In the example of FIG. 3, the operation of system 1 is controlled by PSR controller 24, which is implemented as an IC (integrated circuit) chip as described above in FIGS. 1-2. In the example of FIG. 3, the PSR controller 24 includes ZC sample module 26, constant voltage control (CVC) module 28, and compensation current control module 30.

Compensation current control module 30 provides a compensation current to ZC pin 22 and resistor R1 based on the required output power at load 8. Compensation current module 30 includes sample and hold (S/H) module 32, maximum offset current limit module 34, and voltage to current generator module 36.

S/H module 32 samples and holds the output voltage or signal and provides a voltage or signal to voltage to current generator module 36. In some examples, S/H module 32 detects the output voltage at load 8 from the output voltage or signal of CVC module 28. In other examples, S/H module 32 detects the output voltage at load 8 from the peak voltage at CS pin 20 indicative of the current flowing throwing the primary winding of the transformer.

Maximum offset current limit module 34 limits the output voltage or signal presented from S/H module 32 to voltage to current generator module 36. By limiting the output voltage or signal presented to voltage to current generator module 36, maximum offset current limit module 34 prevents runaway conditions and ensures stability of system 1. In some examples, maximum offset current limit module 34 is a filter (filter 31 as shown in FIG. 2), such as a low pass filter. In other examples, maximum offset current limit module 34 filters the output voltage or signal before S/H module 32 samples and holds the output voltage.

Voltage to current generator module 36 provides a compensation current to ZC pin 22 and resistor R1 of AOV circuit 38 based on the limited output voltage or signal from maximum offset current limit module 34. In other examples, voltage to current generator module 36 provides a compensation current to ZC pin 22 and resistor R1 of AOV circuit 38 based on the direct output voltage or signal from S/H module 32.

In the example of FIG. 3, PSR controller 24 is in an IC packaging with pins 18, 20, 22. The pins 18, 20, 22 are nodes in power converter 4. Gate pin 18 provides a control signal to drive the gate of a transistor, current sense (CS) pin 21 is used to sense the drain-to-source current flowing through the transistor when ON, and zero crossing (ZC) pin 22 is releasably coupled to adjustable offset voltage (AOV) circuit 38. The output from CVC module 28 from PSR controller 24 is provided to compensation current control module 30. The compensation current $I_{cc}$ generated by voltage to current generator module 36 of current compensation control module 30 is provided to AOV circuit 38 via ZC pin 22. AOV circuit 38 includes resistor R1 coupled to the auxiliary winding of the transformer and resistor R2, and R2 is in parallel with capacitor C2. Resistor R1 is adjusted based on a selected charging cable, such as charging cable 52, as described and shown in FIG. 2, where charging cable 52 is used to couple load 8 to filter 6 at nodes 50, 51.

In one example of FIG. 3, power converter 4 uses ZC sample module 26 of PSR controller 24 to sample the voltage at ZC pin 22. In a standard PSR controller, the voltage at the ZC pin is the zero crossing voltage, and is sampled at the point just before the voltage on the auxiliary winding starts to oscillate. The oscillation is due to the existence of the L-C circuit formed by the transformer inductance and the MOSFET output capacitance COSS. When the current in the output diode (not shown) decreases to 0, the voltage on the auxiliary winding begins to oscillate. The voltage just before the oscillation of the auxiliary winding and when the secondary-side diode (not shown) is about to be cut off is very close to output voltage across load 8. The sampled ZC voltage is passed through CVC module 28 (e.g., a PI controller or PID controller depending on the requirements). The output voltage of CVC module 28 provides information on the output level of the voltage at load 8.

Figure 5:
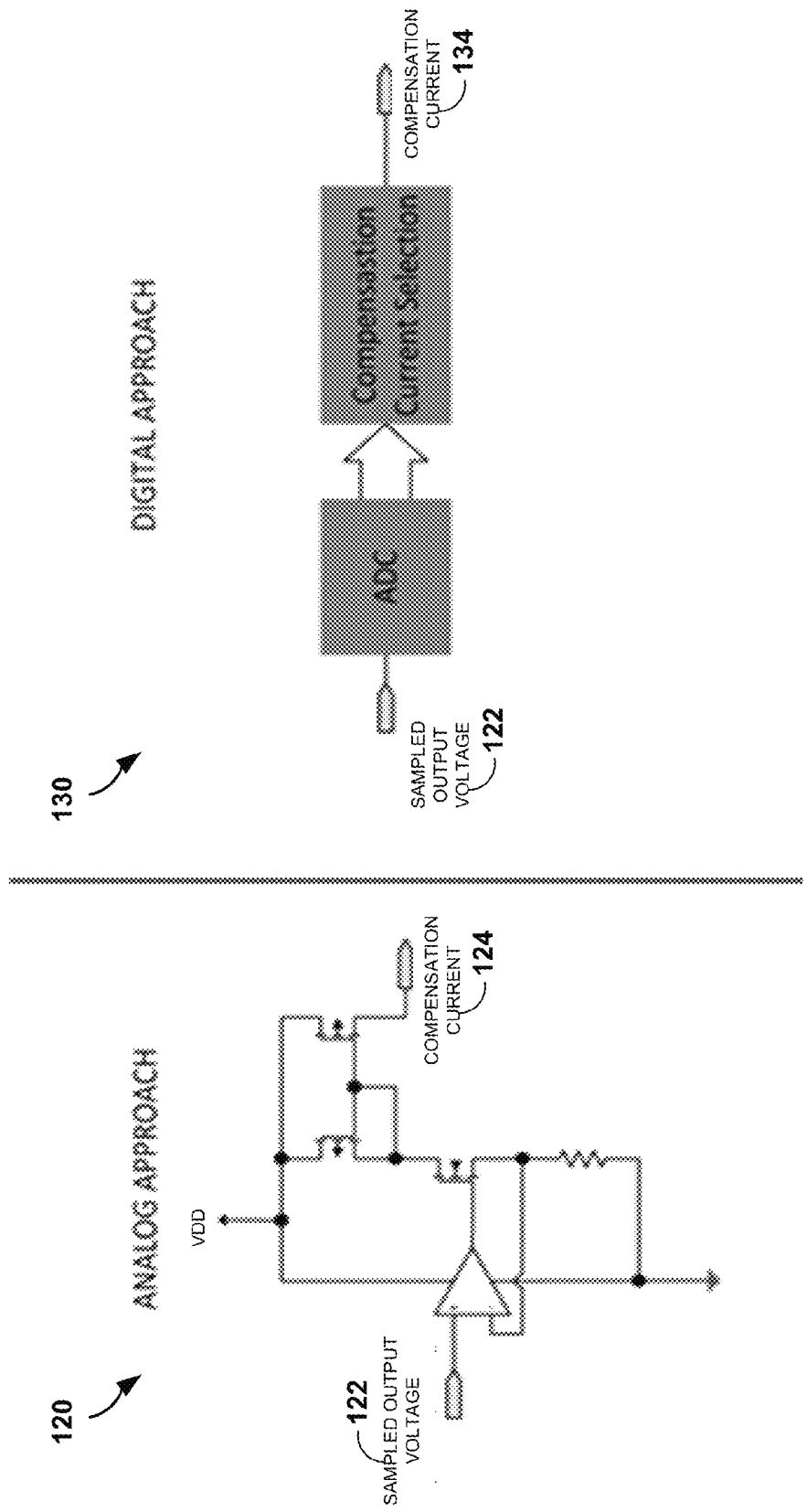
FIGS. 5A and 5B illustrate examples of the analog and digital approach to the voltage to current generator module shown in FIGS. 2-3.

In one example, the output voltage of CVC module 28 is then used to control the amount of compensation current $I_{cc}$ to be provided to AOV circuit 38 by voltage to current generator module 36 via ZC pin 22. The output voltage of CVC module 28 is sampled by S/H module 32 of cable compensation module 30. The sampled output voltage of S/H module 32 from the output voltage of CVC module 28 is used by maximum offset current limit module 32 to limit the sampled output voltage provided to voltage to current generator module 36. The limited sample output voltage provided to voltage to current generator module 36 is converted by either analog or digital means, as shown in FIGS. 5A & 5B, into compensation current $I_{cc}$, and is provided to AOV circuit 38 by compensation current control module 30 via ZC pin 22. The compensation current $I_{cc}$ generates an offset voltage between compensation current $I_{cc}$ and resistor R1 of AOV circuit 38 corresponding to the voltage drop due to the cable impedance of the charging cable. The offset voltage is added to the ZC voltage located at ZC pin 22.

In another example, the output power across load 8 may be sampled by S/H module 32 as the peak voltage of CS pin 20 and used to control the amount of compensation current $I_{cc}$ to be provided to AOV circuit 38 by voltage to current generator module 36 via ZC pin 22. The output voltage of CS Pin 20 is sampled by S/H module 32 of cable compensation module 30. The sampled output voltage of S/H module 32 is used by maximum offset current limit module 32 to limit the sampled output voltage provided to voltage to current generator module 36. The limited sample output voltage provided to voltage to current generator module 36 is converted by either analog or digital means, as shown in FIGS. 5A & 5B, into compensation current $I_{cc}$, and is provided to AOV circuit 38 by ZC pin 22. The compensation current $I_{cc}$ generates an offset voltage between compensation current $I_{cc}$ and resistor R1 of AOV circuit 38 corresponding to the voltage drop due to the cable impedance of the charging cable. The offset voltage is added to the ZC voltage located at ZC pin 22.

In the example of FIG. 3, the output power of power converter 4 may be sampled every period of time. For example, the output power of power converter may be sampled every 2.5 milliseconds. In another example, the output power sampled of power converter 4 is the output voltage of CVC module 28. In other examples, the output voltage sampled of CVC module 28 is a PI controller. The choice of sampling period places a limit on the bandwidth of the system. By sampling the output power instead of continuously monitoring the output voltage in real time, the stability of system 1 may be improved, as described with respect to FIG. 1. Introducing compensation current $I_{cc}$ in real time could also cause undesirable overshoots at ZC pin 22 because system 1 reacts to the offset voltage introduced by AOV circuit 38.

FIG. 4 is a conceptual diagram 100 illustrating sampling point 110 of voltage on the auxiliary winding 108 of the transformer. Gate 102 represents the signal at gate pin 18 that transistor 44 of PSR controller 24, as described with respect to FIGS. 2-3, is either ON or OFF. Primary winding current 104 represents the current flowing through the primary winding of the transformer when gate 102 is either ON or OFF. Secondary winding current 106 represents the current flowing through the secondary winding of the transformer when gate 102 is either ON or OFF. Auxiliary winding voltage 108 represents the voltage present at the auxiliary winding of the transformer when gate 102 is either ON or OFF. Sampling point 110 represents the zero crossing voltage and the output voltage across load 8, as described with respect to FIGS. 1-3.

In the example of FIG. 4, a standard PSR controller, such as PSR controller 24 as described with respect to FIGS. 2-3, samples zero crossing voltage 110 at the point just before auxiliary winding voltage 108 starts to oscillate. The oscillation of auxiliary winding voltage 108 is due to the existence of the L-C circuit formed by the transformer inductance and the MOSFET output capacitance COSS. When secondary winding current 104 flowing through the output diode decreases to 0, auxiliary winding voltage 108 begins to oscillate, and auxiliary winding voltage 108 at the moment before oscillation is zero crossing voltage (sampling point) 110, and represents the output voltage when the secondary-side diode is about to be cut off.

FIGS. 5A & 5B illustrate two approaches for the voltage to current generator shown in FIGS. 2-3. FIG. 5A is a schematic illustrating one example of analog approach 120 to the voltage to current generator module. In the example of FIG. 5A, voltage to current generator module 36 uses a V to I converter, such as a transconductance amplifier to generate compensation current 124. A person with skill in the art will appreciate the variety of methods to implement a transconductance amplifier. FIG. 5B is a flow chart illustrating one example of digital approach 130 to the voltage to current generator module. In the example of FIG. 5B, voltage to current generator module 36 uses an analog to digital converter (ADC) to digitize sampled output voltage 122 and the bits supplied to a controller may select the magnitude of compensation current 134 and generates compensation current 134. Sampled output voltage 122 can be from either the output voltage or signal of CVC module 28 or the peak output voltage or signal of CS pin 20 as described with respect to FIGS. 2-3.

Figure 6:
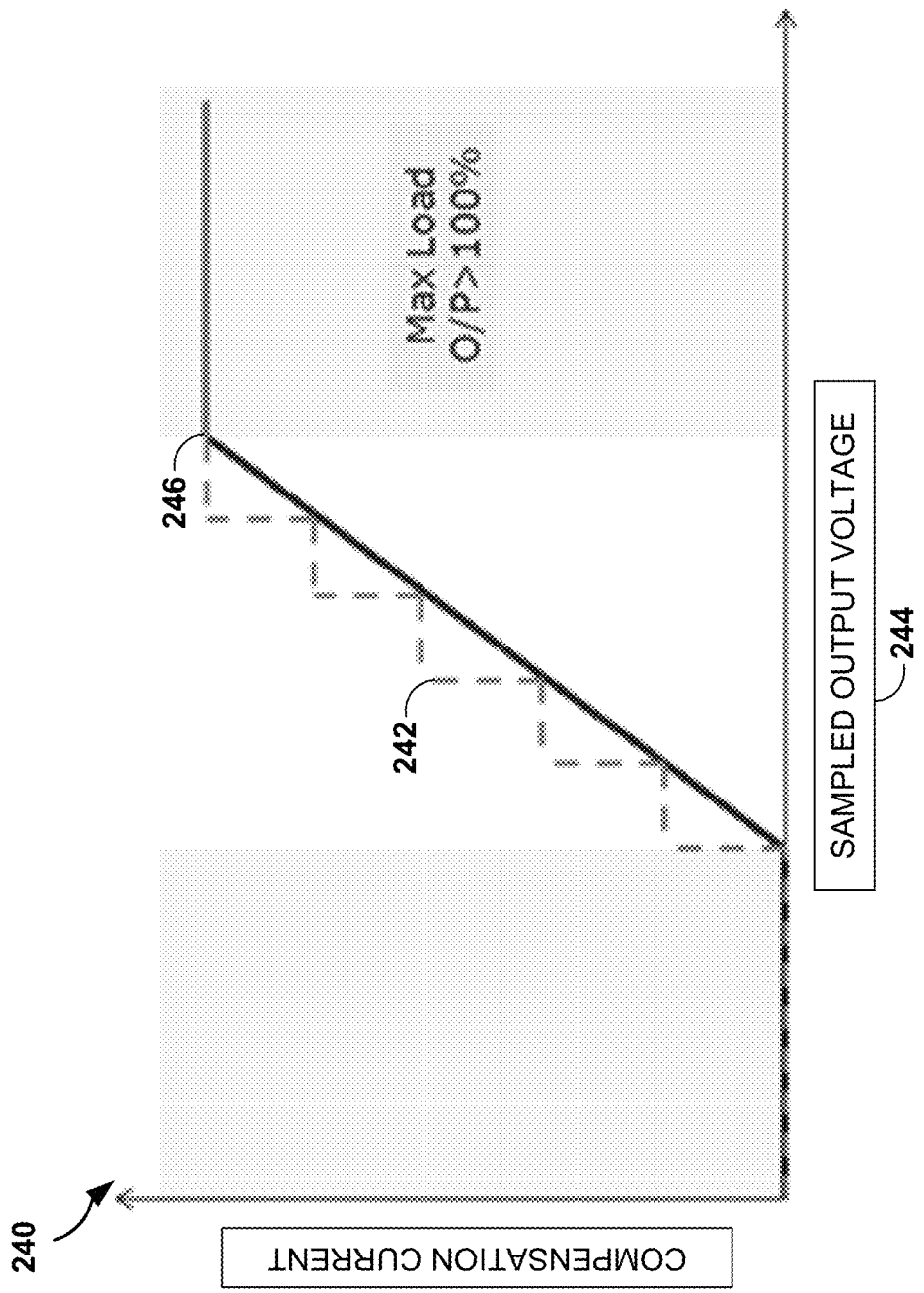
FIG. 6 is a graphical illustration of an example of the relationship between the compensation current and the sampled output voltage of the system shown in FIG. 2.

FIG. 6 is a graphical illustration of an example of the relationship between the compensation current and the sampled output voltage of system 1 shown in FIG. 2.

Compensation current 242 comprises a current that is provided to ZC pin 22 and resistor R1 by compensation current control module 30. Compensation current 242 and resistor R1 provide an offset voltage that corresponds to voltage drop due to the cable impedance of the selected charging cable.

Sampled output voltage 244 may be from the output voltage, the signal of CVC module 28, or the peak output voltage and/or signal of CS pin 20. In some examples, sampled output voltage 244 may have an output voltage beyond the maximum or minimum load of system 1 as described in FIG. 1, and depicted as grey areas in FIG. 6.

Maximum load point 246 is the point at which maximum current offset current limit 34 as described with respect to FIG. 3, prevents compensation current 242 from increasing by limiting the output voltage or signal provided to voltage to current generator module 36 as described with respect to FIG. 3. Maximum load point 246 represents the maximum compensation current provided to ZC pin 22 and resistor R1 by compensation current control module 30, providing a cutoff to the amount of offset voltage added to ZC pin 22 and sampled by PSR controller 24.

In the example of FIG. 6, sampled output voltage 244 is an indication of the output load of the battery charger. Moreover, sampled output voltage 244 is based on the sampled output voltage of the CVC module, which may be a proportional-integral (PI) controller, a proportional-integral-derivative (PID) controller, or the like. In another example, sampled output voltage 244 is based on the peak sense voltage at a current sense (CS) pin of PSR controller 24, as described with respect to FIGS. 2-3, indicative of the inductor current through the primary winding of the transformer. As the load and sampled output voltage 244 increase, as shown in FIG. 6, compensation current 242 increases. The increase in compensation current 242 is necessary because a higher output current flows through the cable impedance of the charging cable when the load is high. The increase in compensation current 242 is provided to ZC pin 22, as described with respect to FIGS. 2-3, coupled to a resistor R1, and compensation current 242 with the resistor R1 provide an offset voltage to compensate for voltage loss due to the cable impedance of charging cable 52 when load 8 is high. In the example of FIG. 6, compensation current 242 is limited 248 to prevent runaway conditions and to ensure stability of system 1, as described with respect to FIG. 1. By providing offset voltage 246 to the system, compensation current 246 causes the ZC sampled voltage to be lower than actual ZC voltage, providing PSR controller 24, as described with respect to FIGS. 2-3, receives information that the output voltage at load 8 is lower than expected. With this information, PSR controller 24 can deliver additional power to load 8 to compensate for the lower output voltage due to the cable impedance of the charging cable and the higher load.

Figure 7:
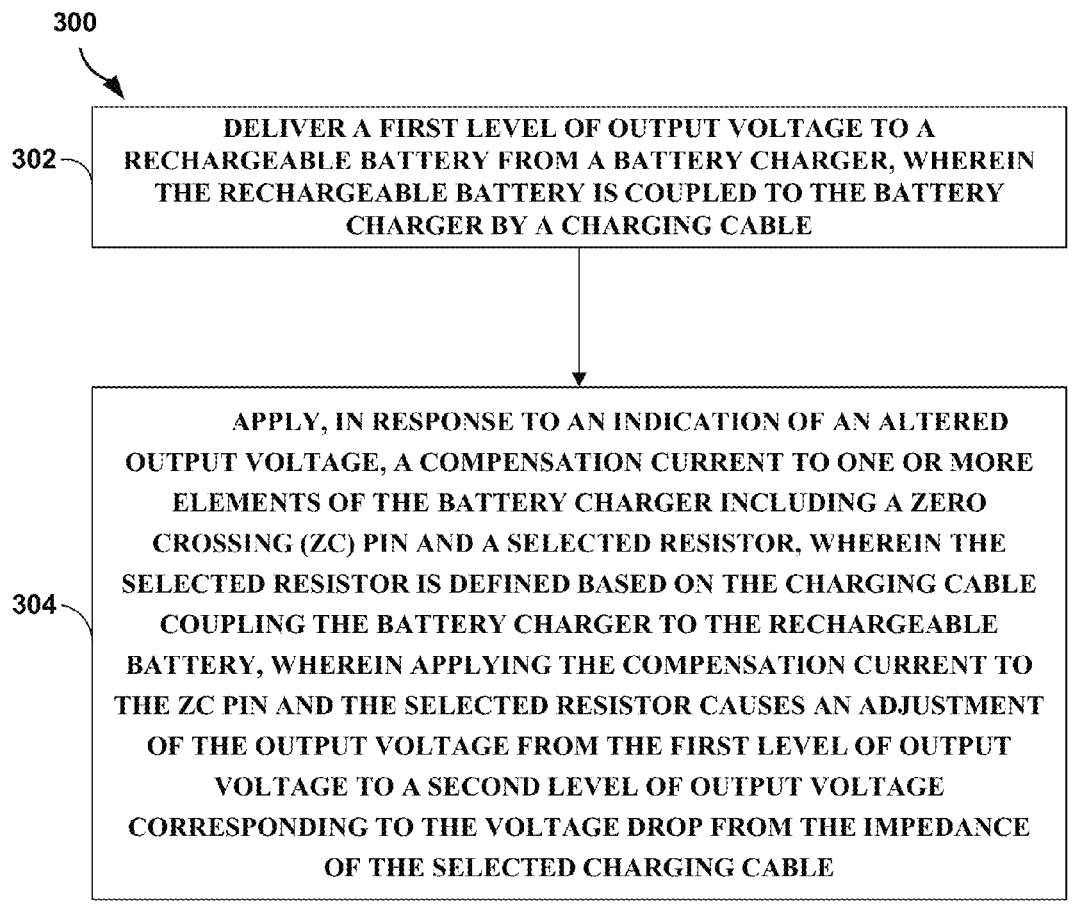
FIG. 7 is a flow chart illustrating a method of providing cable compensation, in accordance with the examples of this disclosure.

FIG. 7 is a flow chart illustrating a method 300 of providing cable compensation, in accordance with the examples of this disclosure. In some examples, a device, such as power converter 4 described above with respect to FIGS. 1-3, may operate to perform method 300. The method will be described with respect to the block diagram and circuit depicted in FIG. 3, but other circuits that include different or more circuit elements may operate to perform method 300. With respect to FIG. 3, power converter 4 is a battery charger and the load is a rechargeable battery, as described with respect to FIG. 1.

In one example, at some moment, a circuit, such as power converter 4 as described by FIG. 1, specifically a controller, such as PSR controller 24 as described by FIG. 2, may deliver a first level of output voltage to a rechargeable battery from a battery charger, wherein the rechargeable battery is coupled to the battery charger by a charging cable (302). The circuit may also receive an indication to charge a rechargeable battery—which in turn indicates an altered output voltage requirement (increasing the output voltage requirement in the case of connecting a rechargeable battery and decreasing the output current requirement in the case of disconnecting a rechargeable battery). The controller may then apply, in response to an indication of an altered output voltage, a compensation current to one or more elements of the battery charger including a zero crossing (ZC) pin and a selected resistor, wherein the selected resistor is defined based on the charging cable coupling the battery charger to the rechargeable battery, wherein applying the compensation current to the ZC pin and the selected resistor causes an adjustment of the output voltage from the first level of output voltage to a second level of output voltage corresponding to the voltage drop from the impedance of the selected charging cable (304).

In another example, the battery charger may apply power to a primary-side-regulation (PSR) controller, wherein the PSR controller controls the voltage level of the power output supplied to a load. The PSR controller controls the voltage level of the power output supplied to the load by sampling a zero crossing (ZC) voltage at a ZC pin of the PSR controller to generate a sampled ZC output voltage signal, generating an output voltage of a constant voltage control (CVC) module as a function of the sampled ZC output voltage signal, sampling an output voltage of the battery charger to generate a sampled output voltage signal, generating a compensation current by a compensation current control module at the ZC pin as a function of the sampled output voltage, wherein the compensation current and the resistor are configured to provide an offset voltage to the ZC pin to offset the voltage drop due to the impedance of the selected charging cable, and comparing the sampled output voltage signal to a sense voltage signal indicative of the inductor current on a primary winding of a transformer to control the battery charger and the charging of the rechargeable battery.

Figure 8A:
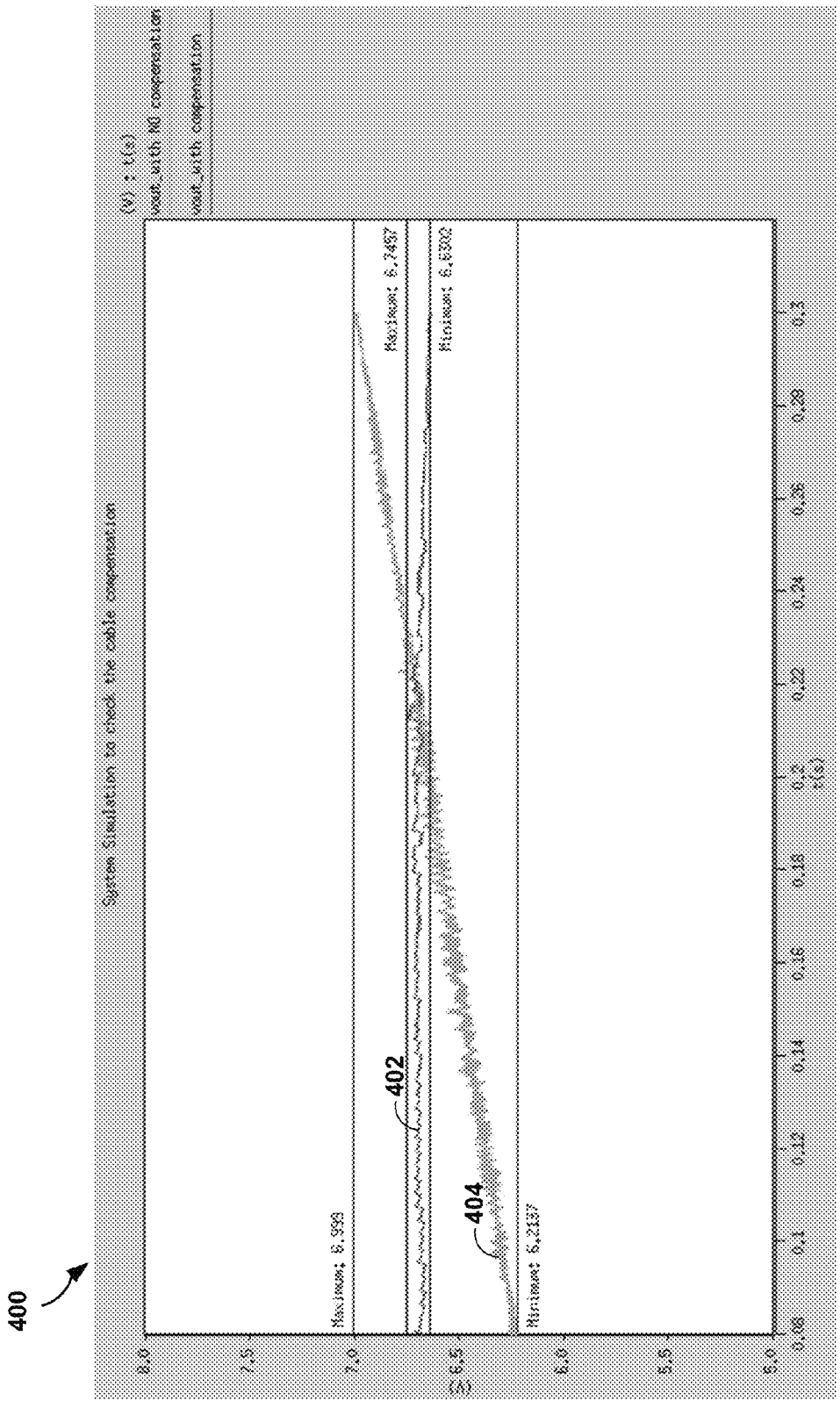
FIGS. 8A & 8B are graphical illustrations depicting voltage waveforms before and after compensating for the charging cable impedance using current compensation control module described in FIGS. 2-3.
Figure 8B:
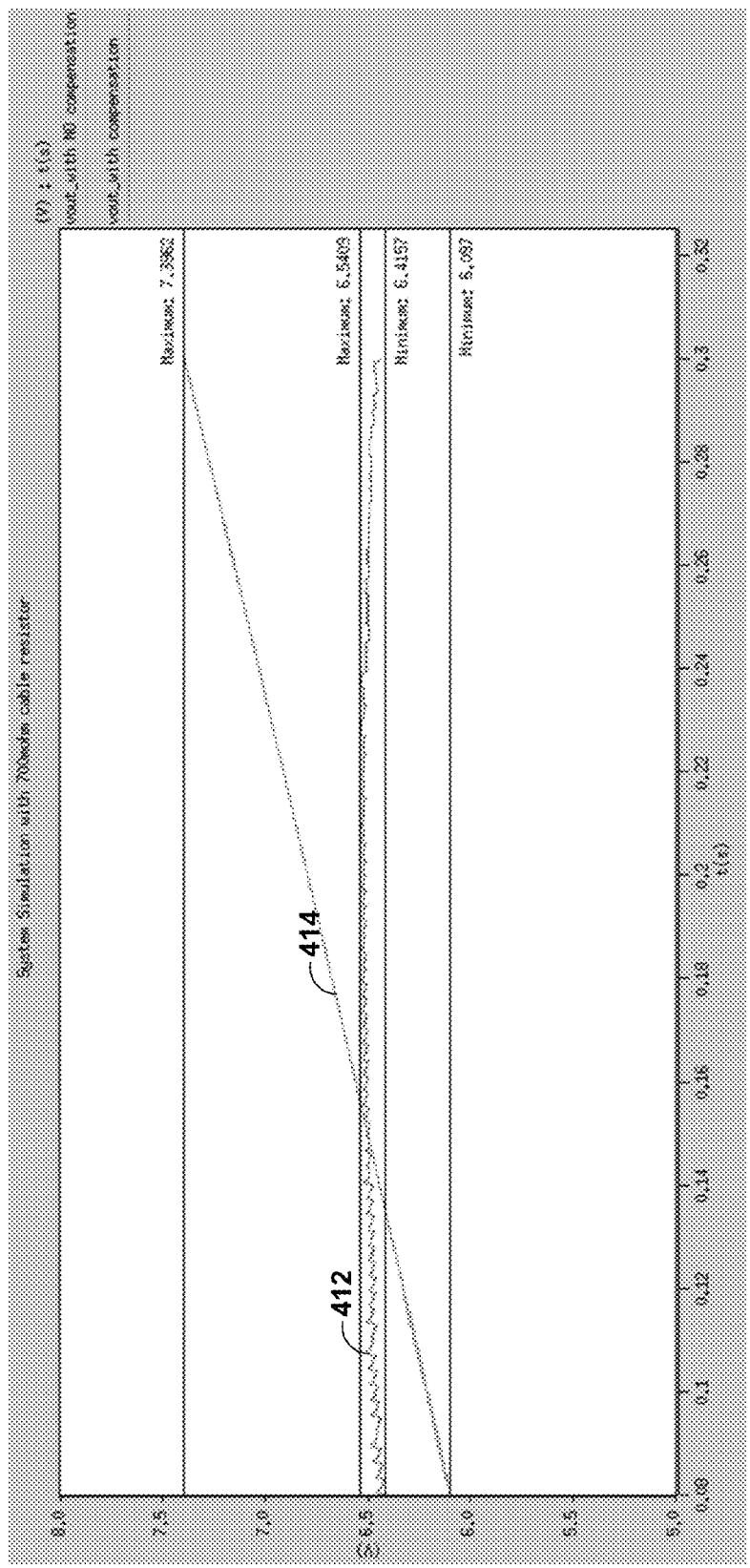

FIGS. 8A & 8B are graphical illustrations comparing voltage waveforms before and after compensating for the charging cable impedance using current compensation control module described above with respect to FIGS. 2-3. These voltage waveforms represent the voltage across the rechargeable battery depicted in FIG. 2, as explained in more detail below. These waveforms help in illustrating the relationships between the elements of FIG. 2 and the change in the system when PSR controller 24 applies a compensation current to ZC pin 22 and resistor R1

Beginning with window 400 of FIG. 8A, illustrates voltage waveform 402 corresponding to the voltage applied to the rechargeable battery using current compensation module 30 and a 400 milliohm resistor for resistor R1. Window 400 also illustrates voltage waveform 404 corresponding to the voltage applied to the rechargeable battery without current compensation module 30.

Window 410 of FIG. 8B illustrates voltage waveform 412 corresponding to the voltage applied to the rechargeable battery using current compensation control module 30 and a 700 milliohm resistor for resistor R1. Window 410 also illustrates voltage waveform 414 corresponding to the voltage applied to the rechargeable battery without current compensation control module 30 and no resistor R1.

FIG. 9 is a statistical illustration depicting the difference between the systems with and without cable compensation shown in FIGS. 8A & 8B. Chart 420 depicts row 422, as shown as window 400 in FIG. 8A, with a charging cable impedance of 400 mΩ and row 424, as shown as window 410 in FIG. 8B, with a charging cable impedance of 700 mΩ. Row 432 reveals that the original system without cable compensation has a minimum output voltage of 6.21 V and a maximum output voltage of 7 V for a percentage spread of 11.9%. Row 432 also reveals that the module with cable compensation has a minimum output voltage of 6.63 V and a maximum output voltage of 6.75 V for a percentage spread of 1.7%. Row 434 reveals that the original system without cable compensation has a minimum output voltage of 6.1V and a maximum output voltage of 7.4 V for a percentage spread of 19.3%. Row 434 also reveals that the system with cable compensation has a minimum output voltage of 6.42V and a maximum output voltage of 6.54 V for a percentage spread of 1.9%. In general, the introduction of an offset voltage by a compensation current at the ZC pin and a resistor to ground reduces the output voltage spread due to the cable impedance of the selected charging cable.

Figure 10:
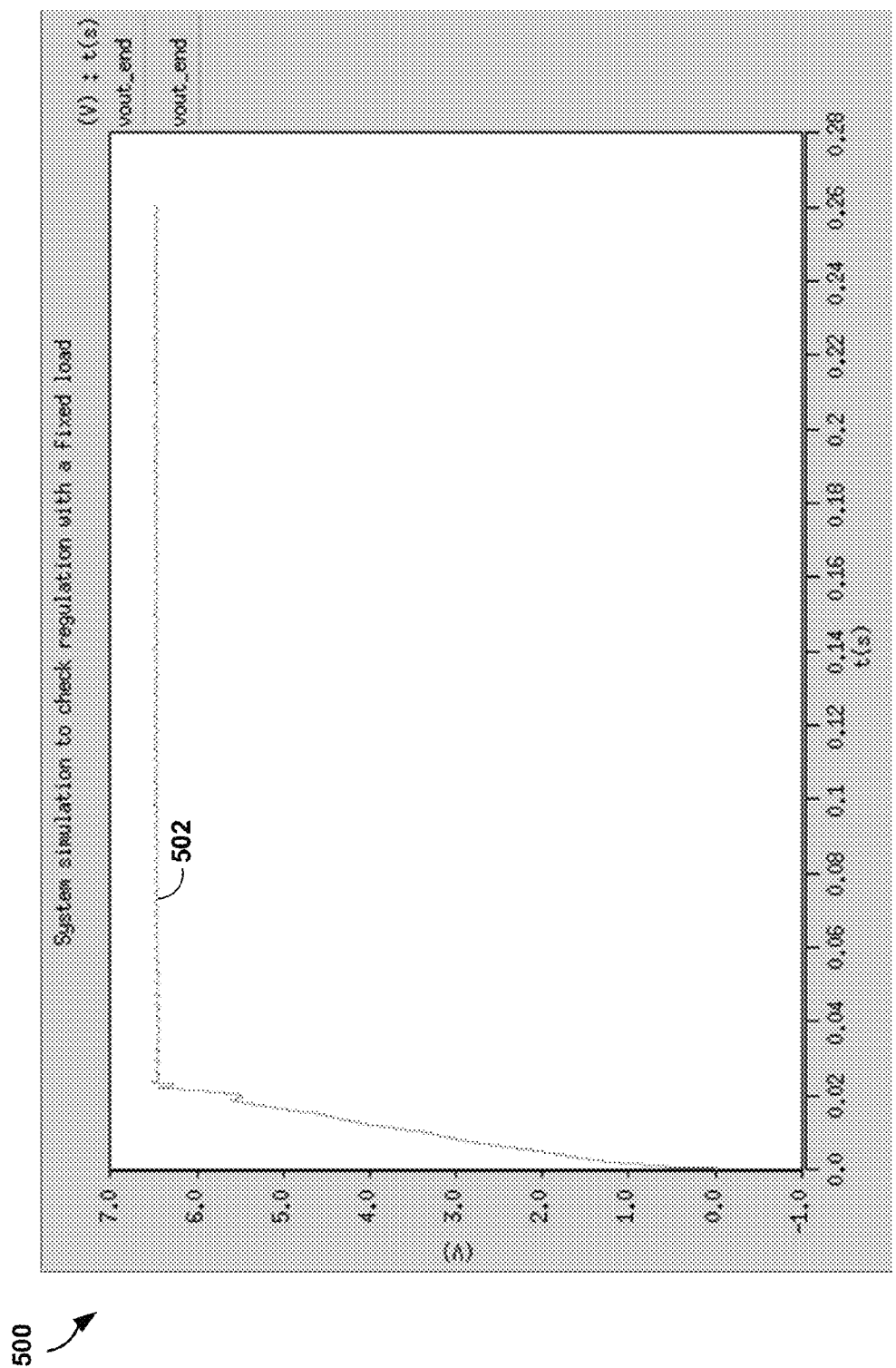
FIG. 10 is a graphical illustration depicting a voltage waveform after compensation for the charging cable impedance using current compensation control module and when the system has a fixed load shown FIG. 2.

FIG. 10 is a graphical illustration depicting a voltage waveform after compensation for the charging cable impedance using current compensation control module 30 and when the system has a fixed load shown in FIG. 2. Window 500 illustrates voltage waveform 502 as the voltage across rechargeable battery 54 depicted in FIG. 2. Waveform 502 helps illustrate the relationship between the elements of FIG. 2, and the stability of the system when PSR controller 24 applies a compensation current to ZC pin 22 and resistor R1 and when the load is fixed. In general, the introduction of an offset voltage by a compensation current at the ZC pin and a resistor to ground does not introduce any instability into system 1.

There several benefits to the disclosed system. In one example, the disclosed system allows the user to adjust the desired output offset by changing the value of resistor R1. In this case the user may be an original equipment manufacturer (OEM) that purchases the circuit and configures to work with a particular cable. The cable impedance of the selected charging cable is not fixed, and the disclosed system provides the flexibility to adjust resistor R1 allowing for a more universal design. Second, the compensation current (i.e., offset voltage) is tracking the output voltage, which is based on the load, whereby a larger load has a larger output voltage, and a larger output voltage has a larger compensation current (i.e., offset voltage). This tracking of the load improves the linearity of the compensation. Finally, no extra external bill-of-material cost is incurred in implementing the cable compensation.

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

Various examples of the invention have been described. These and other examples are within the scope of the following claims.

The invention claimed is:

1. A method comprising:
    delivering a first level of output voltage to a rechargeable battery from a battery charger, wherein the rechargeable battery is coupled to the battery charger by a charging cable; and
    applying, in response to an indication of an altered output voltage, a compensation current to one or more elements of the battery charger including a zero crossing (ZC) pin and a selected resistor, wherein the selected resistor is defined based on the charging cable coupling the battery charger to the rechargeable battery;
    wherein applying the compensation current to the ZC pin and the selected resistor causes an adjustment of the output voltage from the first level of output voltage to a second level of output voltage corresponding to the voltage drop from an impedance of the charging cable.

2. The method of claim 1, wherein the indication of the altered output voltage further comprises:
    operating a primary-side-regulation (PSR) controller, wherein the PSR controller controls the power supplied to the rechargeable battery, the method of controlling the power supplied to the rechargeable battery comprising:
        sampling a zero crossing (ZC) voltage at a ZC pin of the PSR controller to generate a sampled ZC output voltage signal;
        generating an output voltage of a constant voltage control (CVC) module as a function of the sampled ZC output voltage signal;
        sampling an output voltage of the battery charger to generate a sampled output voltage signal;
        generating a compensation current by a compensation current control module at the ZC pin as a function of the sampled output voltage,
        wherein the compensation current and the resistor are configured to provide an offset voltage to the ZC pin to offset a voltage drop due to the impedance of the selected charging cable; and
        comparing the sampled output voltage signal to a sense voltage signal indicative of the inductor current on a primary winding of the transformer to control the battery charger and the charging of the rechargeable battery.

3. The method of claim 1, wherein the selected resistor is a first resistor coupled to a second resistor in parallel with a capacitor.

4. The method of claim 2, wherein the compensation current control module further comprises limiting the sampled output voltage by a maximum current limit module, wherein limiting the sampled output voltage limits the compensation current.

5. The method of claim 2, wherein the sampled output voltage is an output voltage of the CVC module.

6. The method of claim 2, wherein the sampled output voltage is a peak sense voltage at a current sense (CS) pin of the PSR controller indicative of the inductor current through the primary winding of the transformer.

7. The method of claim 2, wherein the ZC sample module is a sample-and-hold module that samples and holds the voltage detected at the ZC pin.

8. The method of claim 2, wherein the CVC module is a proportional-integral (PI) controller, and wherein the PI controller is configured to generate a PI controller output voltage as a function of the sampled ZC output voltage signal from the ZC sample module.

* * * * *